Aug. 6, 1957  R. B. ODDEN  2,802,105
WAVE SELECTING AND SYNCHRONIZING SYSTEM
Filed May 11, 1954

INVENTOR.
ROBERT B. ODDEN
BY
Lockwood, Galt, Woodard, & Smith
ATTORNEYS

United States Patent Office 2,802,105
Patented Aug. 6, 1957

2,802,105
WAVE SELECTING AND SYNCHRONIZING SYSTEM

Robert B. Odden, Buffalo, N. Y., assignor to International Telephone and Telegraph Corporation Application May 11, 1954, Serial No. 428,871

5 Claims. (Cl. 250—27)

The present invention relates to a wave selecting and synchronizing system and more particularly to such a system having utility in connection with radar, or radio range indicating devices.

In radio ranging systems one of the primary objects is to measure accurately the distance between a fixed reference point and a remotely located object or target. For various reasons, certain systems for making such measurements provide a limited degree of accuracy which, for some applications, make them unsuitable or at best extremely difficult to operate.

In certain ranging equipment a series or train of accurately spaced impulses are used to measure the spacing between a fixed or initiating triggering impulse and an echo impulse, the spacing between the train impulses being known beforehand and thereby being capable of utilization in making such measurement much in the same manner as a yardstick would be used to indicate the number of inches between two points to be measured. In order for the ranging system to provide accurate results, it is necessary that the main triggering impulse be locked into synchronization with the impulses of the measuring wave train, since relative movement between this main impulse and the train impulses disrupts the measuring techniques and produces inaccuracies which in some cases cannot be tolerated. Certain systems which utilize this method for measuring range, which are constructed as simply as possible, utilize a main triggering impulse which is not locked into synchronization with the measuring wave train. Absence of synchronization serves to impair measurements as will be understood by the simplified analogy of trying to measure the distance between two points by means of a yardstick when one of the points is constantly moving with respect to the yardstick.

In view of the foregoing, it is an object of this invention to provide from a random initiating impulse a wave selecting and synchronizing system which provides a main triggering impulse and a train of measuring impulses which are all locked into exact synchronism therewith.

It is another object of this invention to provide a system of the preceding object which when used in connection with radar equipment serves to minimize the commonly observed echo impulse "jitter." This "jitter" may be observed on a radar display screen as constant random movement of the echo impulse, and causes extreme difficulty in making a precise measurement.

In accordance with the present invention there is provided a wave selecting and synchronizing system comprising a first source of low frequency impulses, a second source of high frequency impulses, a third source of high frequency impulses in exact frequency synchronism with said second source impulses but displaced in phase therefrom, a first gating circuit operatively coupled to said first source and operative in response to one of the low frequency impulses to produce a gating signal, a first mixing circuit operatively coupled to the first gating circuit and to the second source and operative in response to this gating signal to conduct one of the second source impulses, a second gating circuit operatively coupled to the first mixing circuit and operative in response to the one said second source impulse to produce a second gating signal, and a second mixing circuit operatively coupled to the second gating circuit and to the third source and operative in response to said second gating signal to conduct at least one of said third source impulses which occurs later in time than said one second source impulse.

For a better understanding of the invention, together with other and further objects thereof, reference is made to the following description, taken in connection with the accompanying drawing, the scope of the invention being defined by the appended claims.

Figure 1:
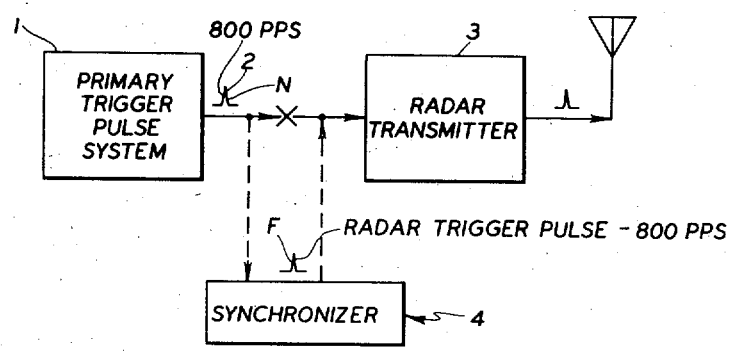
Fig. 1 is a general block diagram of one embodiment of this invention.

Referring now to Fig. 1, the block 1 represents the conventional radar ranging circuitry which provides a primary trigger impulse occurring at the rate of, for example, 800 impulses per second. In the conventional system, these trigger impulses, indicated both by the reference numeral 2 and the reference letter N, are fed to a radar transmitter indicated by the reference numeral 3 and serve to trigger the transmitter into emitting a signal which is reflected by an impinged target and detected in the usual manner by the radio ranging receiver. In accordance with conventional techniques, the time elapsed between the emission of the impulse by the transmitter and the reception of the reflected impulse or echo from a target may be used as a measurement of the distance between the target and the transmitter. If a display screen is utilized for purpose of observing both the main transmitter signal and the echo, the distance between these two impulses on the display screen may be calibrated in terms of conventional units of measurement such as yards or miles whereupon it becomes necessary to have available a method of calibrating the display screen and interpreting the spacing between the two impulses.

Figure 3:
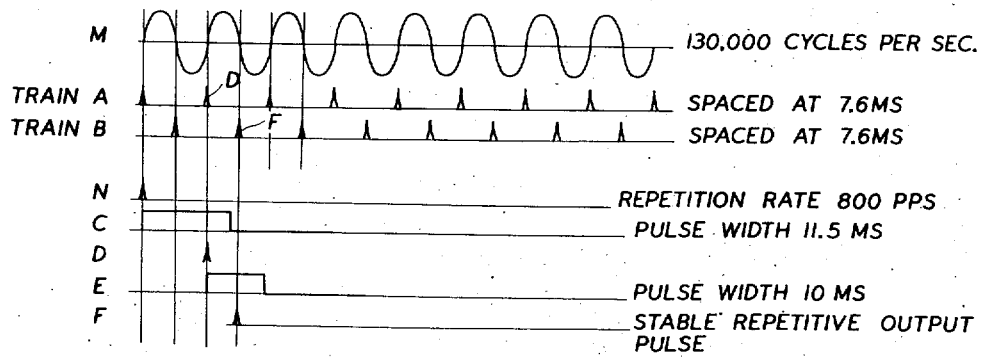
Fig. 3 is a graph representing the wave forms developed at certain points of the system of Fig. 2.

In one system of measurement, a train of accurately spaced impulses, such as the train A of Fig. 3, may be used as marking indicia on the display screen itself and in effect superimposed over the main impulse and reflected echo to determine the spacing between the latter. By knowing the time duration between successive impulses of the train A, the total time elapse between transmitting the main impulse and receiving the echo can be determined.

In order to use effectively this system of measuring the spacing between the two impulses seen on the screen, it is necessary that the main impulse be synchronized accurately with respect to the occurrence of one of the marking impulses of, for example, train A, and it is the purpose of the synchronizer indicated by the block 4 to provide this exact lock-in synchronization. In Fig. 1, dotted lines are used to indicate how the synchronizer 4 is coupled into the circuit between the blocks 1 and 3, the reference letter X serving the indicate that the original line between the blocks 1 and 3 is severed and bridged by the synchronizer 4.

Figure 2:
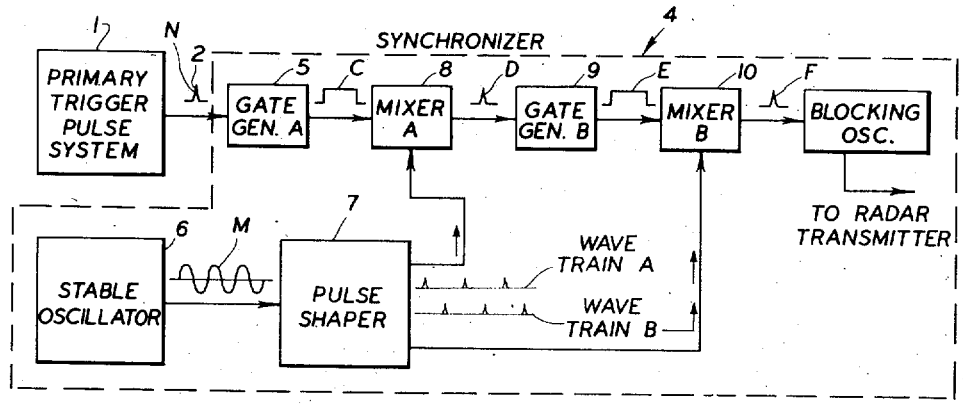
Fig. 2 is a detail block diagram thereof.

Fig. 2 represents in detail the combination of the primary trigger impulse-producing circuit 1 and the synchronizer circuitry 4, that portion of the combination actually comprising the synchronizer being contained inside the dashed line block of Fig. 2.

Since all of the circuitry and components utilized in this synchronizer and the remainder of the system are well-known to the art, it is not necessary to explain the detailed arrangements thereof. The gate generator 5 is operatively coupled to the triggering impulse system 1 and is operative in response to the impulse 2 to provide a gating signal C of, for example, 11.5 microseconds in duration. This gating signal generator 5 may consist of the usual "one-shot" multivibrator which is triggered into immediate action by the input impulse 2 to produce the gating signal C. The timing constants of this multivibrator are so selected that not more than one pulse C will be produced for every impulse 2.

A stable source of sine wave oscillations, indicated by the reference numeral 6, is designed to generate a signal of, for example, approximately 130,000 cycles per second, this signal being indicated by the reference letter M in Fig. 3. This circuit 6 may comprise the usual crystal-controlled oscillator, and as will appear from the following description, actually constitutes the timing source for providing the synchronized time measurements alluded to hereinbefore.

Coupled to this oscillator 6 is a pulse shaper 7 which produces in response to the sine wave M two signal outputs characterized hereinafter as wave trains A and B. These wave trains are illustrated in proper phase relationship with the sine wave M in Fig. 3. This pulse shaper 7 is of conventional design and produces pulses each time the sine wave crosses the zero or time axis. The pulses of both trains A and B are formed as narrowly as possible and may be spaced, for example, 7.6 microseconds apart as indicated in Fig. 3. It will appear obvious that in order to obtain this particular time spacing between the train impulses, the frequency of the oscillator 6 will have to be accordingly adjusted.

Coupled to both the gating signal generator 5 and the pulse shaper 7 is a first mixing circuit 8 which is conductive only during the periods the gating signal C occurs. This mixing circuit A may be comprised of a type 6AS6 tube having two control grids, one of these grids being fed by the gating signal C and the other being supplied with the impulses of wave train A. The circuit which includes this 6AS6 tube is so arranged that one or two of the impulses in the wave train A is conducted through to the circuit output during the occurrence of the gating signal C, none of the remaining pulses being so conducted through to this output during the period the gating signal C is not present.

The function of the mixer A may be better understood by reference to Fig. 3. The primary trigger impulse N initiates the gating signal C which is of sufficient duration to occur simultaneously with at least one and at most two of the impulses of the wave train A. If the phase relationship between the primary trigger pulse N and the wave train A is that illustrated in Fig. 3, the gating signal C will cause the mixing circuit 8 to pass the second pulse of the train A as indicated.

Returning now to Fig. 2, a second gating signal generator 9, which may be identical to the gating generator 5, is coupled to the mixing circuit 8 and operates in response to the selected pulse D of wave train A to produce a second gating signal indicated by the reference letter E. This gating signal E may be substantially identical to the signal C, but in the preferred arrangement is limited to a time duration of 10 microseconds. A second mixing circuit 10 is coupled to both the gating generator 9 and the output circuit of the impulse shaper 7 which supplies the wave train B, this mixing circuit 10 operating in the same manner as the circuit 8 to select one of the pulses of wave train B.

Referring now to Fig. 3, the selected pulse D triggers the gating generator 9 to produce the gating signal E which in turn opens the mixer 10 to select the next succeeding pulse of wave train B as indicated by the reference letter F. This selected pulse F (see Fig. 1) may now be used as the "main bang" or radar triggering impulse in the same manner as was conventionally performed by use of the pulse 2.

The pulses of wave train B succeeding the selected pulse F may now be used as time or space markers by the radar equipment, and since the selected pulse F is actually one of the marker pulses, exact synchronized phase relationship must exist therebetween. In the analogy previously presented, the markers of wave train B constitute the yardstick and the selected impulse F represents the signal transmitted by the radar equipment 3. Since the two are exactly fixed in position, and assuming the detected object or target to be essentially fixed, the echo will appear fixed on a display screen also with respect to the yardstick marker B. The "jitter" previously mentioned is thus reduced to a minimum thereby increasing the accuracy of ranging measurements as well as the ease with which such measurements may be taken.

In the usual system, the primary source of triggering signals represented by the block 1 may be unstable and still not interfere with the proper operation of the system, since the radar equipment is actually triggered by the synchronizer 4 which is dependent upon the stable oscillator 6 for both the radar triggering impulse and the marking signals. A minimum of equipment can thereby be utilized for producing the primary triggering impulses 2 at the rate of, for example, 800 pulses per second, while the reliable crystal type oscillator 6 will serve to provide the necessary signal information with sufficient accuracy to achieve the desired results.

While the impulse width of the second gating generator (pulse E) has been indicated as preferably being 10 microseconds in duration, actually it is only necessary that this pulse be so designed as to be certain of selecting only the next impulse of wave train B which succeeds the first selected pulse D from the wave train A. This single selected pulse F from the wave train B thereby becomes the main pulse for triggering the radar transmitter.

While there has been described what is at present considered the preferred embodiment of the invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. A system of the character described comprising a first source of low frequency impulses, a second source of high frequency impulses, a third source of high frequency impulses in exact synchronism with said second source impulses but displaced in phase therefrom, the phase of said first source impulses being unstable with respect to the phase of said second and third source impulses, a first gating circuit operatively coupled to said first source and operative in response to one of said low frequency impulses to produce a gating signal, a first mixing circuit operatively coupled to said first gating circuit and to said second source and operative in response to said gating signal to conduct one of said second source impulses, a second gating circuit operatively coupled to said first mixing circuit and operative in response to said one second source impulse to produce a second gating signal, and a second mixing circuit operatively coupled to said second gating circuit and to said third source and operative in response to said second gating signal to conduct one of said third source impulses which occurs later in time than said one second source impulse.

2. A system of the character described comprising a first source of low frequency impulses, a second source of high frequency impulses, a third source of high frequency impulses in exact synchronism with said second source impulses but displaced in phase therefrom, the phase of said first source impulses being unstable with respect to the phase of said second and third source impulses, a first gating circuit operatively coupled to said first source and operative in response to one of said low frequency impulses to produce a gating signal, a first mixing circuit cooperatively coupled to said first gating circuit and to said second source and operative in response to said gating signal to conduct one of said second source impulses, a second gating circuit operatively coupled to said first mixing circuit and operative in response to said one second source impulse to produce a second gating signal, and a second mixing circuit operatively coupled to said second gating circuit and to said third source and operative in response to said second gating signal to conduct the one of said third source impulses which next succeeds said one second source impulse.

3. A system of the character described comprising a first source of low frequency impulses, a second source of high frequency impulses, a third source of high frequency impulses in exact synchronism with said second source impulses but symmetrically displaced in phase therefrom, the phase of said first source impulses being unstable with respect to the phase of said second and third source impulses, a first gating circuit operatively coupled to said first source and operative in response to one of said low frequency impulses to produce a gating signal, a first mixing circuit operatively coupled to said first gating circuit and to said second source and operative in response to said gating signal to conduct one of said second source impulses, a second gating circuit operatively coupled to said first mixing circuit and operative in response to said one second source impulse to produce a second gating signal, and a second mixing circuit operatively coupled to said second gating circuit and to said third source and operative in response to said second gating signal to conduct the one of said third source impulses which next succeeds said one second source impulse.

4. A system of the character described comprising a first source of low frequency impulses, a second source of high frequency impulses, a third source of high frequency impulses in exact synchronism with said second source impulses but symmetrically displaced in phase therefrom, the phase of said first source impulses being unstable with respect to the phase of said second and third source impulses, a first gating circuit operatively coupled to said first source and operative in response to one of said low frequency impulses to produce a gating signal, a first mixing circuit operatively coupled to said first gating circuit and to said second source and operative in response to said gating signal to conduct one of said second source impulses, a second gating circuit operatively coupled to said first mixing circuit and operative in response to said one second source impulse to produce a second gating signal, and a second mixing circuit operatively coupled to said second gating circuit and to said third source and operative in response to said second gating signal to conduct the one of said third source impulses which next succeeds said one second source impulse, the gating signals of both gating circuits being of substantially the same duration, such duration being greater than the time spacing between successive impulses of said second source so as to insure occurrence thereof during the generation of at least one of said second or third source impulses.

5. A system of the character described comprising a first source of low frequency impulses, a stabilized source of high frequency sine wave oscillations, a pulse-shaping circuit coupled to said stabilized source and operative in response to said oscillations to produce two synchronized impulse wave trains separated in phase by one hundred eighty degrees (180°), the phase of said first source impulses being unstable with respect to the phase of said stabilized source oscillations, a first gating circuit coupled to said first source for generating a gating signal in response to one of said low frequency impulses, a first mixing circuit operatively coupled to said gating circuit and said pulse shaping circuit and operative in response to said gating signal to conduct one impulse of one wave train, a second gating circuit coupled to said first mixing circuit for generating a second gating signal in response to said one wave train impulse, and a second mixing circuit coupled to said second gating circuit and said pulse shaping circuit and operative in response to said second gating signal to conduct one impulse of the other wave train, this last-mentioned impulse being the next succeeding said one wave train impulse.

References Cited in the file of this patent

UNITED STATES PATENTS

| 2,636,165 | Hulsizer et al. | Apr. 21, 1953 |
| 2,688,077 | White et al. | Aug. 31, 1954 |